(12) United States Patent
Chandrashekar et al.

(10) Patent No.: US 11,915,026 B1
(45) Date of Patent: Feb. 27, 2024

(54) SOFTWARE CONTAINERS WITH USER-SELECTABLE SECURITY LEVELS

(71) Applicant: Amazon Technologies, Inc., Seattle, WA (US)

(72) Inventors: Samartha Chandrashekar, Bellevue, WA (US); Archana Srikanta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 17/020,634

(22) Filed: Sep. 14, 2020

(51) Int. Cl.
| | | |
|---|---|---|
| G06F 9/455 | (2018.01) | |
| G06F 9/50 | (2006.01) | |
| G06F 9/54 | (2006.01) | |
| G06F 21/60 | (2013.01) | |
| G06F 9/48 | (2006.01) | |

(52) U.S. Cl.
CPC ........ *G06F 9/45558* (2013.01); *G06F 9/4881* (2013.01); *G06F 9/5077* (2013.01); *G06F 9/547* (2013.01); *G06F 21/606* (2013.01); G06F 2009/45587 (2013.01)

(58) Field of Classification Search
CPC .. G06F 9/45558; G06F 9/4881; G06F 9/5077; G06F 9/547; G06F 21/606; G06F 2009/45587
See application file for complete search history.

(56) References Cited

U.S. PATENT DOCUMENTS

| | | | |
|---|---|---|---|
| 10,002,247 B2 | 6/2018 | Suarez et al. | |
| 10,104,185 B1 * | 10/2018 | Sharifi Mehr | .......... H04L 67/51 |
| 10,353,726 B2 | 7/2019 | Duan | |
| 10,586,042 B2 | 3/2020 | Stopel et al. | |
| 2005/0268336 A1 * | 12/2005 | Finnegan | ................ G06F 21/31 |
| | | | 714/E11.207 |
| 2007/0282572 A1 * | 12/2007 | Larus | .................... G06F 9/5066 |
| | | | 703/2 |

OTHER PUBLICATIONS

U.S. Appl. No. 16/017,886, filed Jun. 25, 2018,. Upendra Bhalchandra Shevade et al.
U.S. Appl. No. 16/368,747, filed Mar. 28, 2019, Anthony Nicholas Liguori et al.
U.S. Appl. No. 16/676,329, filed Nov. 6, 2019, Samartha Chandrashekar.
U.S. Appl. No. 17/020,642, filed Sep. 13, 2020, Samartha Chandrashekar.
Arun Gupta, et al., "Announcing the Firecracker Open Source Technology: Secure and Fast microVM for Serverless Computing", AWS Open Source Blog, Nov. 27, 2018, Source https://aws.amazon.com/blogs/opensource/firecracker-open-source-secure-fast-microvm-serverless/, pp. 1-11.
AWS, "Amazon ECS User Guide for AWS Fargate" API Version Nov. 13, 2013, Revised Jul. 9, 2020, pp. 1-374.

* cited by examiner

*Primary Examiner* — Wissam Rashid
(74) *Attorney, Agent, or Firm* — Robert C. Kowert; Kowert, Hood, Munyon, Rankin & Goetzel, P.C.

(57) ABSTRACT

In accordance with input received via a programmatic interface, a level of isolation at which a software container is to be executed is determined. Based on the level of isolation, a category of virtual machines of a virtualized computing service is selected for executing the software containers. The selected category differs from other categories in at least the number of devices emulated for virtual machines of the categories. The software container is run within a virtual machine of the selected category.

20 Claims, 10 Drawing Sheets

US 11,915,026 B1

SOFTWARE CONTAINERS WITH USER-SELECTABLE SECURITY LEVELS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. In some cases, software containers may be run within such virtual machines. Instantiating several different virtual machines on the same host may also help increase the overall hardware utilization levels at a data center, leading to higher returns on investment.

In many cases, virtualized resources may be used for applications that access or manipulate sensitive information which has to be protected. For example, financial applications, medical applications and the like may all deal with data sets that are intended to be kept confidential. Security-related artifacts such as cryptographic keys, digital certificates and the like may be utilized to ensure confidentiality and privacy of some applications.

Figure 1:
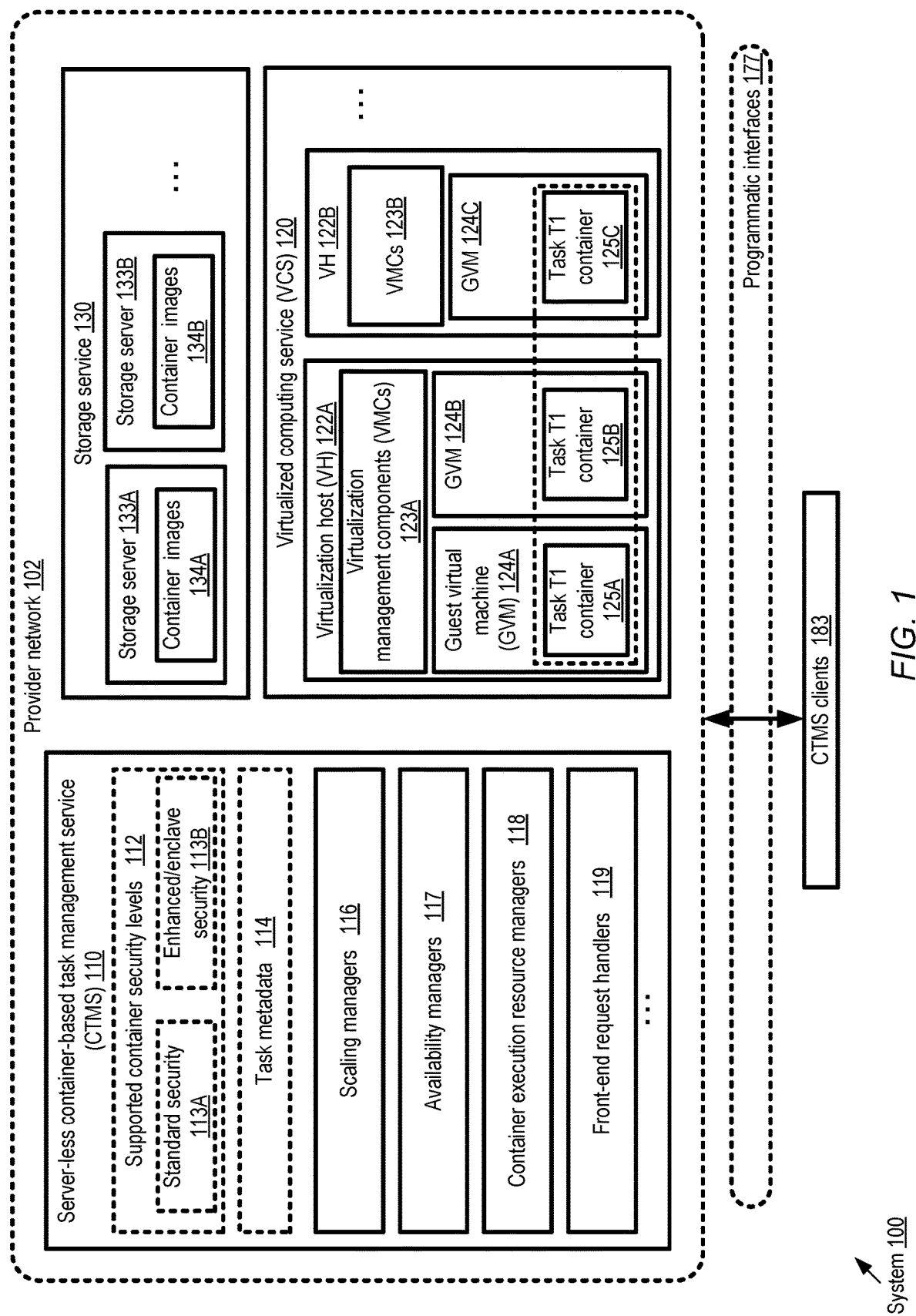
FIG. 1 illustrates an example system environment in which a server-less container based task management service which supports containers with selectable security levels may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to technology that enables confidential computing enclaves in a serverless container service. Specifically, the present disclosure relates to methods and apparatus for enabling the configuration of software containers with user-selected security and isolation levels using resources of a provider network or cloud computing environment, without requiring the users to specify or pre-acquire computing resources for their containers. Confidential computing refers to the use of a trusted execution environment, also known as an enclave, to protect data while in-use. Enclaves are designed to execute applications in a protected environment that separates applications and data inside the enclave from the operating system and other applications on the device hosting the enclave. In a cloud computing environment, a cloud-based enclave product can include cryptographic attestation for customer software, so that the customer can be sure that only authorized code is running, as well as integration with a key management service, so that only the enclave can access sensitive material. Further, the cloud-based enclave can be managed by a hypervisor that creates the isolation between an enclave and a corresponding virtual machine instance. Managing a cloud-based enclave using a hypervisor can beneficially enable the creation of enclaves with varying combinations of CPU cores and memory.

Software containers are an increasingly popular paradigm for implementing software applications, especially in cloud computing environments. A software container packages up code and all its dependencies so that an application or task can run quickly and reliably despite being transferred from one computing environment to another. A "server-less" container-based task management service of the provider network may enable its clients to simply indicate the kinds of containers that they need to accomplish various tasks/applications, and allow the service to select the appropriate resources at which each container instance of each task instance is run. Such a service may be referred to as "server-less" or "serverless" because its clients do not have to be concerned about acquiring and managing specific physical and/or virtual machines being used for their tasks and containers; the clients only have to define their tasks' computing needs in logical terms, and leave the management of servers and other resources to the service. A task or application which utilizes one or more software containers is referred to as a container-based task.

A client of a container-based task management service may sometimes wish to execute a subset of a task's computations using a highly-secure software container, such that the possibility of leakage or loss of sensitive data (and/or misuse or loss of sensitive logic executed at the container) is minimized or eliminated. Such sensitive data may, for example, include cryptographic keys or other artifacts needed for business-critical operations, and the sensitive logic may include programs that execute the business-critical operations. Other computations of the task may not require quite as high a level of trust, and may therefore be run at containers which provide a standard or default level of security. Note that in accordance with the policies of the provider network, the standard level of security may also provide substantial protection for data and programs, but the client may nevertheless wish to use enhanced security containers for some operations. In one usage pattern, secure computations of a given task may be performed, as and when needed, using a high-security-level container, and the results of the secure computations may then be processed further at one or more standard-security containers. Because of the limited kinds of operations needed to be implemented at the high-security-level containers, a smaller set of computing functionality (e.g., access to fewer emulated devices or fewer operating system calls (sycalls)) may be required at the high-security-level containers than are needed at the standard-security-level containers. Reducing the set of supported computing functionality for high-security-level containers also has the important benefit of reducing the possibilities/opportunities of successful attacks.

In some cases a server-less task management service may use one or more other services of the provider network to fulfill clients' task execution requirements. For example, a virtualized computing service of the provider network may enable several different categories of guest virtual machines (also referred to as compute instances) to be configured, with the categories differing from each other along several dimensions such as the collections of emulated devices included in their device models. The container-based task management service may select different categories of the guest virtual machines to run containers with respective security/isolation requirements.

As one skilled in the art will appreciate in light of this disclosure, certain embodiments may be capable of achieving various advantages, including some or all of the following: (a) substantially enhancing the security of container-based applications that deal with sensitive or confidential data, (b) reducing the amount of processing and/or networking resource usage associated with recovery operations (such as revocations of digital certificates, re-generation and re-distribution of encryption keys etc.) resulting from compromises of security artifacts, and (c) improving the user experience of clients of container-based task management services, as well as administrators of applications that are run at such services, e.g., by providing clearer insights into the resources used specifically for sensitive data computations.

According to some embodiments, a system may comprise one or more computing devices. The computing devices may include instructions that upon execution on or across the one or more computing devices cause the one or more computing devices to obtain a task configuration request indicating several software containers of a task. In various embodiments, the request may be received via one or more programmatic interfaces of a container-based task management service (CTMS) of a provider network. The set of software containers indicated in the request may include a first software container and a second software container, and the request may also indicate that a targeted security level of the second software container exceeds a targeted security level of the first software container. In some implementations, for example, a respective security-related parameter may be specified in the request for each of the containers, and the parameter may indicate that a standard level of security is requested for the first container, while an enhanced level of security is requested for the second container. In other implementations, security-related parameters may only be specified in the request for the particular containers which need high security; the other containers may be assumed to need the standard level of security by default. The request may not indicate a resource to be used to execute any of the software containers in at least some embodiments.

In various embodiments, the CTMS may cause respective virtual machines to be launched (or selected from one or more pre-launched pools of virtual machines) for the respective containers of the task. In accordance with the respective targeted security levels of the first and second software containers, different categories of virtual machines may be used for the two containers. For example, the number of device types emulated for a first virtual machine (e.g., in a device model or virtual motherboard) at which the first container with a lower targeted security level is to be run may exceed the number of device types emulated for a second virtual machine to be used for the higher-targeted-security container in at least some embodiments. The number of system calls supported by the operating system kernel of the first virtual machine may be larger than the number of system calls supported by the operating system kernel of the second virtual machine in various embodiments. In addition, in at least one embodiment, while each of the virtual machines may include a container runtime environment, the number of application programming interfaces (APIs) supported by the container runtime environment of the first virtual machine may be larger than the number of APIs supported by the container runtime environment of the second virtual machine.

In various embodiments, the CTMS may cause the first software container to be executed in the first virtual machine, and the second software container to be executed in the second virtual machine, e.g., by launching a respective CTMS agent in each of the virtual machines and transmitting container launch commands to such agents. One or more configuration settings of the second virtual machine may be set such that communication between the second software container and entities external to the second virtual machine via channels other than a secure communication channel established between the first and second virtual machines are prevented/prohibited in various embodiments.

After the software containers have been configured and started up within their respective virtual machines, in at least some embodiments one or more computations may be performed using a security artifact (such as a cryptographic key) within the second software container (the one with the higher security level), with the security artifact being inaccessible from the first software container or other components external to the second virtual machine. A result of such computations may be transmitted to the first software container, e.g., using the secure communication channel established between the two virtual machines.

In some embodiments, several (or all) of the containers of a given multi-container task may be executed at the same virtualization host of a virtualized computing service (or a virtualization host managed by the CTMS itself). In other embodiments, at least some containers of a given task may be executed at a different virtualization host than other containers of the task. In one such embodiment, for example, a special purpose virtualization host (e.g., a host equipped with more hardware security devices than other virtualization hosts, or a host for which more stringent physical security is implemented at a data center than is implemented for other virtualization hosts at the data center) may be used only for high security containers, for example, while other containers may be run at general-purpose virtualization hosts.

A variety of different techniques may be used to implement secure communication channels between the virtual machines used for different containers of a task in some embodiments. In at least one embodiment, in a scenario in which a high-security-level container is run at the same virtualization host as a standard-security-level container with which it is to communicate, one or more shared memory buffers may be used to implement the secure channel. In other embodiments in which a high-security-level container is run at a different virtualization host than a standard-security-level container of the same task, the secure communication channel may utilize or implement a secure networking protocol (e.g., a version of IPSec (Internet Protocol Security)).

A client of a CTMS may indicate several attributes of a desired task's containers via programmatic interfaces in different embodiments, in addition to the respective targeted security or isolation levels of the containers. For example, a respective machine image may be indicated for at least some of the containers, respective computing requirements (such as a count of virtual CPUs and/or virtual GPUs) may be indicated, respective memory requirements may be indicated, and so on. In some embodiments, a task descriptor indicating some or all of these attributes or properties may also indicate inter-container connectivity requirements—e.g., specifying with which other containers each of the containers is expected/required to communicate.

In at least some embodiments, to obtain an additional level of assurance regarding security of their containers, a client of a CTMS may indicate an attestation service to which evidence of the trustworthiness of the virtualization hosts used for their containers is to be provided. In such an embodiment, the CTMS and/or the virtualized computing service used may cause such evidence (e.g., log records generated at a trusted platform module (TPM) of the virtualization host) to be transmitted to the attestation service from the virtualization host, and the client's containers may only be started up at the virtualization host after the state of the host has been verified by the attestation service.

As mentioned above, a CTMS providing support for containers with user-selectable security levels may be implemented at a provider network in some embodiments. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a container-based task management service providing functionality of the kind discussed above. A VCS may also be referred to as an elastic compute service, virtual machines service, computing cloud service, compute engine, and/or cloud compute in various implementations.

Example System Environment

FIG. 1 illustrates an example system environment in which a server-less container based task management service which supports containers with selectable security levels may be implemented, according to at least some embodiments. As shown, system 100 includes resources and artifacts of a number of network-accessible services of a provider network 102, including a server-less container-based task management service (CTMS) 110, a virtualized computing service (VCS) 120, and a storage service 130. The CTMS 110 may implement a set of programmatic interfaces 177 in the depicted embodiment, such as one or more web-based consoles, command-line tools, application programming interfaces (APIs), and/or graphical user interfaces. The programmatic interfaces 177 may be used by CTMS clients 183 to submit various types of requests pertaining to containers and/or tasks which the clients wish to define and run using provider network resources in various embodiments.

The CTMS 110 (referred to in various implementations as an elastic container instance service, container instance service, or cloud run service) may include several subcomponents in the depicted embodiments, including front-end request handlers 119, container execution resource managers 118, availability managers 117, and scaling managers 116, each of which may be implemented using software and/or hardware of one or more computing devices. The CTMS may store a set of task metadata 114, indicating for example the constituent software containers of tasks to be run on behalf of CTMS clients. A given task, whose definition or descriptor may be submitted by a CTMS client via programmatic interfaces 177, may comprise one or more software containers. Within a task, individual software containers may be run at respective security levels of a plurality of supported container security levels 112 in the depicted embodiment, such as a standard security level 113A and an enhanced security level 113B. The enhanced security level may be referred to as an "enclave" security level in some embodiments, and the containers run at such levels may be referred to as enclave containers or trusted containers. In some embodiments, more than two container security levels may be supported at a CTMS—e.g., clients may be enabled to select from standard security, medium enhanced security, and high enhanced security levels for their containers.

The front-end request handlers 119 may receive client-submitted programmatic requests, and pass on corresponding internal messages to other components of the CTMS 110 in the depicted embodiment to perform the requested operations, validate and store the metadata indicated in the requests, and so on. Container execution resource managers 118 may be responsible for identifying (e.g., selecting, provisioning, activating and/or launching) at least an initial set resources to be used to run various container instances of a task on behalf of CTMS clients. Availability managers 117 may be responsible for monitoring the health (e.g., responsiveness) of various containers set up by the container execution resource managers 118, and for responding to failures or errors detected at containers—e.g., by causing a replacement container to be set up in the event of a failure. Scaling managers 116 may be responsible for monitoring performance metrics associated with tasks and their constituent containers, and (if needed, based on the clients' preferences) instantiating additional containers to handle increasing workloads in some embodiments. In some embodiments, at least a subset of the functions of scaling managers and/or availability managers may be implemented at a separate service referred to as a container orchestration service.

In some embodiments, descriptor or definitions of tasks may be registered in response to programmatic requests received at the CTMS via programmatic interfaces 177. A given task descriptor may for example indicate the set of constituent containers of a task, the targeted security levels at which the tasks are to be run (selected from among supported container security levels 112), the computing and memory resources needed for each of the constituent containers, the machine images to be used for each of the containers, and so on. In at least some embodiments, the container images may be stored at a storage service 130 (e.g. container mages 134A and container images 134B at storage server 133A and storage service 133B respectively) of the provider network, and a client may indicate the identifiers to be used to access the images from the storage service in the task descriptors. Records representing the task descriptors may be stored as task metadata 114 by the CTMS. In at least some embodiments, CTMS clients may separately request registration of containers, by providing container descriptors, and then refer to the pre-registered containers when providing task descriptors.

After registering tasks and/or task containers, a CTMS client may submit a separate request via programmatic interfaces 177 to run an instance of a specified task in some embodiments. In other embodiments, separate registration and run requests may not be needed—e.g., a client may use a single request to define a task and its constituent containers, and also request that one or more instances of the task be run.

In at least some embodiments, the container execution resource managers may utilize resources of virtualized computing service (VCS) 120 to run tasks' container instances. The VCS 120 may include a plurality of virtualization hosts (VHs) 122, such as 122A and 122B, with each VH comprising a set of virtualization management components (VMCs) 123 (e.g., VMCs 123A and 123B) and zero or more guest virtual machines (GVMs) 124 such as GVMs 124A, 124B or 124C. GVMs may also be referred to as compute instances. VMCs 123 may comprise, for example, a hypervisor and/or an administrative virtual machine in various embodiments which collectively act as intermediaries between the GVMs and at least some hardware components of the VHs. In some embodiments, at least some VMC functionality (e.g., functionality associated with networking virtualization) may be performed using a set of offload cards connected via a peripheral interconnect (such as Peripheral Component Interconnect—Express (PCIe)) to the primary processors of the VH, thereby freeing up more of the computing resources of the VH for GVMs. GVMs 124 may also be referred to as compute instances in various embodiments.

A VCS may support several different categories or classes of GVMs in the depicted embodiment. The categories may differ from one another along one or more dimensions, such as computing capacity, memory capacity, storage capacity, the number and types of emulated devices supported by the VMCs for the GVMs, the number of system calls supported by the operating system kernels of the GVMs, the capabilities (e.g., number of APIs) supported by middleware components such as container runtimes included in the GVMs, and so on.

In response to a request to run a task which includes containers of different security levels, in some embodiments respective GVMs 124 may be used for individual containers of the task in the depicted embodiment. For example, the container execution resource managers, working together with control plane or administrative components of VCS 120 and VMCs 123, may cause a respective GVM of a selected GVM category to be launched for each container of a task. In the example scenario depicted in FIG. 1, a task T1 contains three containers 125A, 125B and 125C, run at respective GVMs 124A, 124B and 124C. The GVM category for a given container may be selected depending at least on the security level targeted for the container in various embodiments. For example, the GVM category selected for a container to be run at enhanced security level 113B may (a) emulate fewer devices than the GVM category selected for a container to be run at standard security level 113A, (b) support fewer operating system calls than the GVM category selected for a container to be run at standard security level 113A, and/or provide a more limited container runtime environment (with fewer container runtime APIs supported) than the GVM category selected for a container to be run at standard security level 113A in at least some embodiments.

In at least some embodiments, the communication capabilities of the GVM used for an enhanced-security container may be restricted—e.g., over-the-network communications with external processes or programs (programs running at a host other than the VH used for the GVM) may be prohibited, direct access to persistent storage may be prohibited, and so on. Some of these restrictions may follow from the limited set of devices emulated for the GVM in various embodiments; other types of configuration settings may be used to enforce the isolation of the GVM in other embodiments. A highly secure channel (e.g., a channel which utilized shared memory regions of the virtualization host) may be set up for communication between the enhanced security container and external processes or entities, such as one or more standard security level containers of the same task in various embodiments. In at least some embodiments, such a secure channel may be the only mechanism which can be used to transfer data in and out of the enhanced security container. In one embodiment, even the types of communications permitted on such a channel may be restricted—e.g., processes running within the enhanced security container may only be allowed to transmit results of computations performed within the enhanced security container in a particular format, and only receive requests for such results via the channel. Note that other factors, such as the desired computing or memory capacity of the containers, may also play a role in the selection of the GVM categories in various embodiments.

After the GVMs for the containers of a task have been launched or identified, in at least some embodiments the CTMS 110 may launch respective agents in each of the GVMs, and then use the agents to start up the containers of the task. In various embodiments, the machine images used for the enhanced-security containers may comprise pre-selected security artifacts (e.g., cryptographic keys) to be used to perform computations on behalf of the CTMS client at whose request the task is run. In other embodiments, a secure channel of the kind mentioned above may be used to send security artifacts to be used for the computations to the enhanced-security containers, e.g., using a protocol similar to TLS (Transport Layer Security) which prevents intermediaries such as standard security containers from accessing the security artifacts. The secure computations may be performed at the enhanced security containers as needed based on the overall logic of the task, and results may be provided to various destinations via the secure communication channels in at least some embodiments.

Example Categories of Guest Virtual Machines Used for Containers

Figure 2:
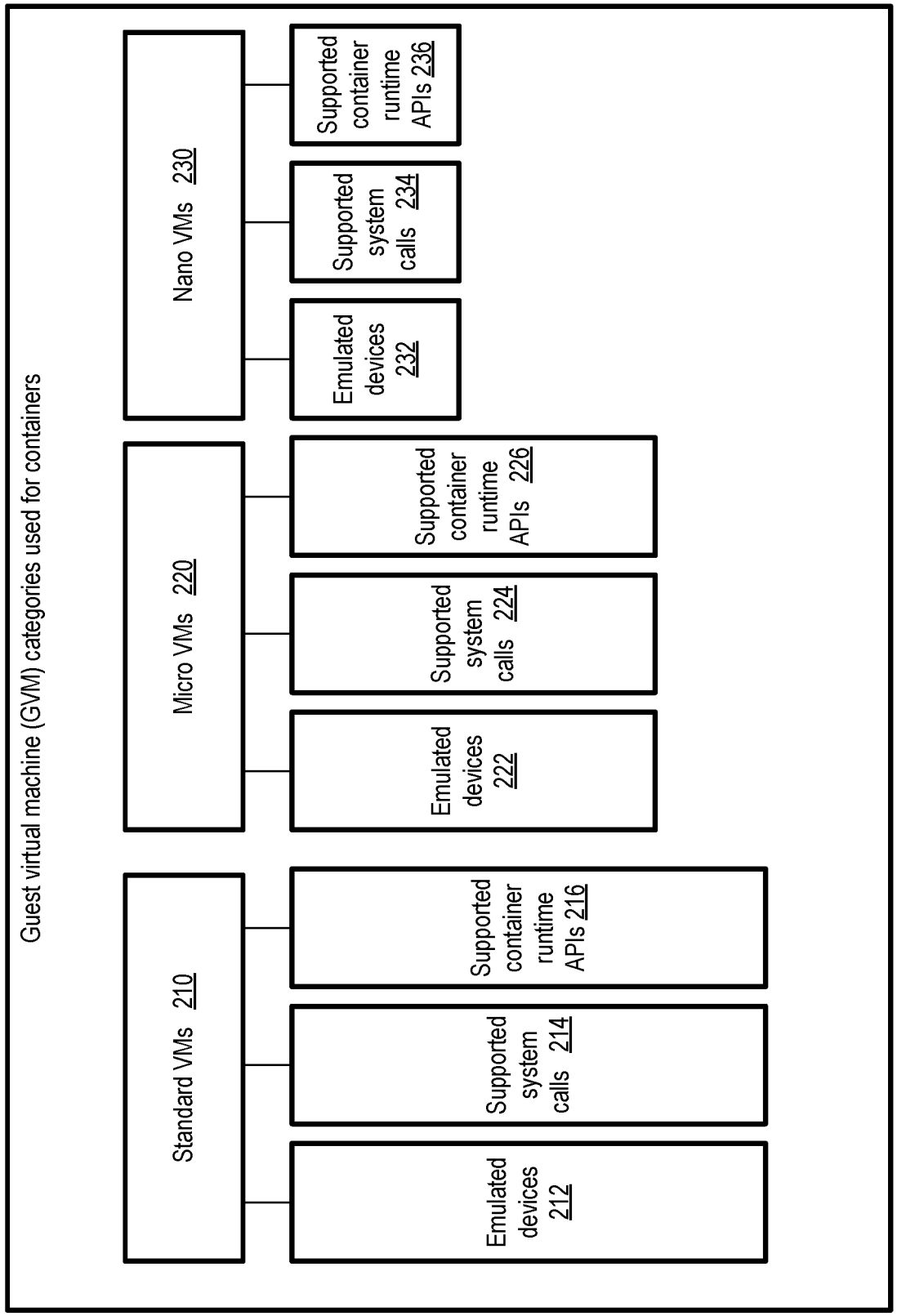
FIG. 2 illustrates example categories of guest virtual machines which may be employed for running software containers, according to at least some embodiments.

FIG. 2 illustrates example categories of guest virtual machines which may be employed for running software containers, according to at least some embodiments. In the depicted embodiment, at least three types of guest virtual machines or compute instances may be implemented at virtualization hosts of a VCS similar to VCS 120 of FIG. 1: standard VMs 210, micro VMs 220 and nano VMs 230. With respect to supporting different levels of container security, three key distinguishing characteristics of the GVM categories are indicated in FIG. 2: their differences regarding their respective sets of emulated devices, their differences regarding supported system calls, and their differences regarding supported container runtime APIs. Note that the GVM categories may also differ from one another with respect to one or more other characteristics in various embodiments, such as their maximum compute capacities (expressed for example in units such as virtual CPUs or virtual GPUs), the amount of available memory, networking constraints such as the numbers of virtual networking interfaces which can be supported or the maximum bandwidth or message rates supported, the time taken to boot/start the GVMs, and so on. Generally speaking, the performance capacities of standard VMs 210 (e.g., maximum vCPUs, memory, networking etc.) may be greater than the corresponding performance capacities of micro VMs 220, and the performance capacities of micro VMs may be greater than the corresponding performance capacities of nano VMs 230. Boot or startup times may be shorter for nano VMs than for micro VMs in some embodiments, and shorted for micro VMs than for standard VMs.

As suggested by the relative sizes of the elements used to represent them in FIG. 2, the set of emulated devices 212 for a standard VM 210 may be larger than the set of emulated devices 222 of a micro VM 220, and the set of emulated devices 222 of a micro VM 230 may in turn be larger than the set of emulated devices 232 of a nano VM 230. For example, in some embodiments, the emulated devices 212 may comprise all of the device types supported in a computing standard (such as the PC-AT (Personal Computer-Advanced Technology) standard, including floppy disks, CD-ROMs, keyboards, mice and the like. However, for some types applications run using standard security level software containers, many of these devices may not typically be needed, so a smaller set of device types may be emulated for micro VMs used for such containers. Furthermore, for enhanced security containers, emulated of even fewer devices may be needed—e.g., in some embodiments, even the devices emulated for networking and/or persistent storage may not be used for the kinds of operations implemented at enhanced security containers. As such, nano VMs with a very small set of emulated devices may suffice for running enhanced security containers in the depicted embodiment.

Similar reasoning may be employed to limit the sets of system calls 224 and 234 supported in micro VMs 220 and nano VMs 230 respectively, relative to the set of system calls 214 supported by the operating system of a standard VM. A wider range of programs may be expected to be run at standard VMs than at micro VMs, so more operating system calls may have to be supported at the standard VMs than at the micro VMs, thereby enabling a stripped-down version of the operating system to be used for the micro VMs. Similarly, an even smaller-footprint operating system kernel may be needed for the kinds of operations performed at nano VMs.

The term "container runtime" or "container runtime environment" may be used to refer to a collection of software components that executes containers and manages container images within a given computing environment such as a GVM. Examples of popular container runtimes include containerd, rkt, and lxd. A given container runtime may implement a set of APIs, such as a "run" API to run an instance of a container using a specified image, a "stop" API to stop execution of a container instance, a "gc" command to initiate garbage collection, a "metadata-service" API to help a running application inspect its execution environment and assert its identity, a "list" API to obtain a listing of related pods or groups of containers, and so on. For the kinds of computations to be run at some containers, only a subset of such APIs may be needed (for example, a list API or a metadata service API may not be needed), so respective increasingly stripped-down versions 226 and 236 of the container runtimes may be prepared for micro and nano VMs respectively in the depicted embodiment.

In some embodiments, micro VMs 220 of a VCS may be used for standard security level containers, and nano VMs 230 may be used for enhanced security containers, while standard VMs 210 may be used for compute instances which are not going to be used for containers. In other embodiments, standard VMs may also be used for some standard security level containers, e.g., based on the performance requirements of the containers, and micro VMs may be used for some enhanced security level containers for similar reasons. In at least one embodiment, more than three categories of GVMs may be supported by a VCS and utilized for containers by a CTMS, or only two categories may be used. In various embodiments, the particular category of virtual machine to be used for a given software container may be selected by a CTMS based at least partly on a targeted security level or targeted isolation level of the software container.

According to some embodiments, a lightweight virtual machine manager (LVMM) may be used to support the execution of micro VMs and/or nano VMs. Such an LVMM may be part of the set of virtualization management components of a virtualization host. Such LVMMs may enable the launch of micro-VMs and nano VMs at some types of virtualization hosts in fractions of a second. The micro VMs and nano VMs can take advantage of the security and workload isolation provided by traditional or standard VMs and the resource efficiency that comes along with containers, for example by being run as isolated processes by the LVMM. In some cases, the memory requirements of micro VMs and/or nano VMs may be so low that thousands of them can be packed onto a single virtualization host. In one implementation, each process of the LVMM may encapsulate one and only one micro VM or nano VM. The LVMM process may run the following threads in such an implementation: API, VMM (virtual machine manager) and vCPU(s). The API thread may be responsible for an API server and associated control plane. The VMM thread may expose a machine model, a reduced or minimal device model, a metadata service, and VirtIO device emulated network and block devices in some implementations. In addition, there may be one or more vCPU threads (e.g., one per CPU core assigned to the micro or nano VM).

Example Task Descriptor

Figure 3:
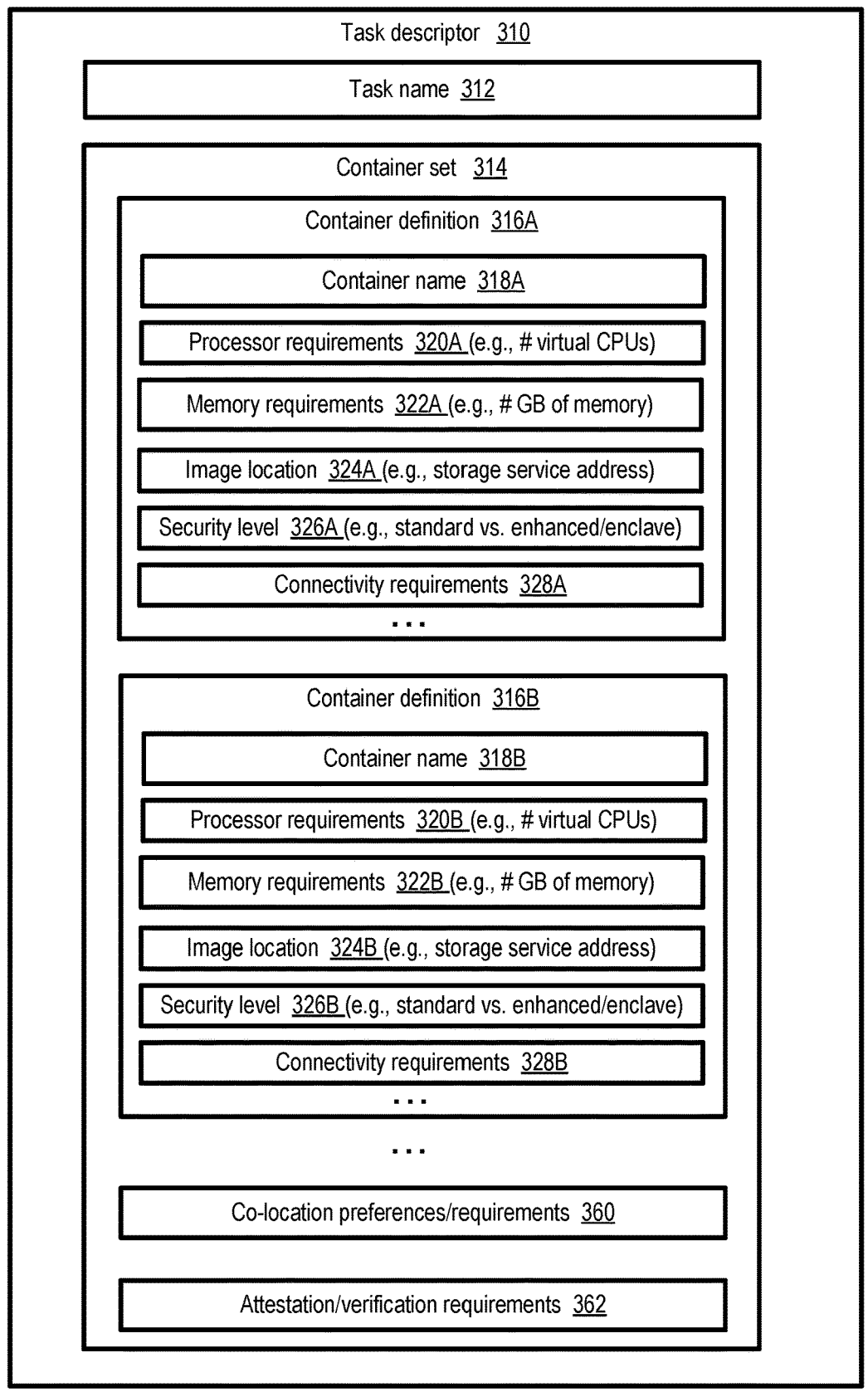
FIG. 3 illustrates an example descriptor of a container-based task, according to at least some embodiments.

FIG. 3 illustrates an example descriptor of a container-based task, according to at least some embodiments. Such a descriptor may, for example, be submitted to a CTMS similar to CTMS 110 of FIG. 1 by a client via one or more programmatic interfaces. As shown, a task descriptor 310 may include a user friendly task name 312 and a container set 314. The container set 314 may in turn comprise one or more container definitions 316, such as 316A and 316B.

A given container definition 316 may include a container name 318 (e.g., 318A or 318B), processor requirements 320 (e.g., 320A or 320B) such as the number of virtual CPUs to be allocated/assigned to the container, memory requirements 322 (e.g., 322A or 322B), image location 324 (e.g., 324A or 324B) indicating where the executable image for the container can be located, a security level 326 (e.g., 326A or 326B, which may indicate whether standard security or enhanced security is desired for the container) and/or connectivity requirements 328 (e.g., 328A or 328B) in the depicted embodiment. Security levels may also be referred to as isolation levels in some embodiments. The connectivity requirements 328 for a given container may indicate the set of other containers of the task with which the given container is expected to communicate in some embodiments, the types of communication mechanisms/channels to be used, and so on. In at least one embodiment, the default connectivity configuration for a task (e.g., if no connectivity requirements are provided in the task descriptor 310) may allow every container to communicate with every other container of the task. In some embodiments a task descriptor may indicate the particular category of virtual machine to be used for at least some containers—e.g., for an enhanced security level container, the task descriptor may indicate that a "nano" virtual machine (one of several supported categories of virtual machines of a VCS) is to be used.

In one embodiment, a task descriptor 310 may indicate co-location preferences/requirements 360, indicating whether all the containers are to be co-located on the same virtualization host, specific subsets of the containers which are to be co-located on respective virtualization hosts, or whether the choice of mapping containers to virtualization hosts is left up to the CTMS. In other embodiments, co-location parameters or preferences may be provided via programmatic interfaces by a client at a more global level (e.g., by choosing the equivalent of a setting "run all the containers of a given task at the same virtualization host" applicable to all of the client's tasks), and the CTMS may decide how virtual machines used for the client's containers are to be placed on virtualization hosts based on the co-location parameter or preferences.

According to some embodiments, a task descriptor may indicate one or more resource verification requirements 362 (also known as attestation requirements) for the task as a whole or for individual containers. In accordance with such verification/attestation requirements, a resource approval message may have to be obtained from one or more client-specified attestation services or resource verifiers for a virtualization host before the corresponding software containers or their virtual machines are run at the virtualization host. In at least one embodiment, a task descriptor 310 may include other elements than those shown in FIG. 2: for example, such elements may indicate logging requirements for the containers, whether persistent storage is to be made accessible from individual containers (and if so the type of persistent storage needed), whether the task as a whole is to be allowed to continue execution even if some containers finish or fail, load balancing requirements for the different containers, and so on. In some embodiments, a higher-level construct called a client-initiated service may be defined as a group of tasks, and a service descriptor may indicate for example which task descriptor(s) to use, how many instantiations of each tasks are to be run, how the workload should be balanced among the instantiations, and so on.

Example Task Configuration

Figure 4:
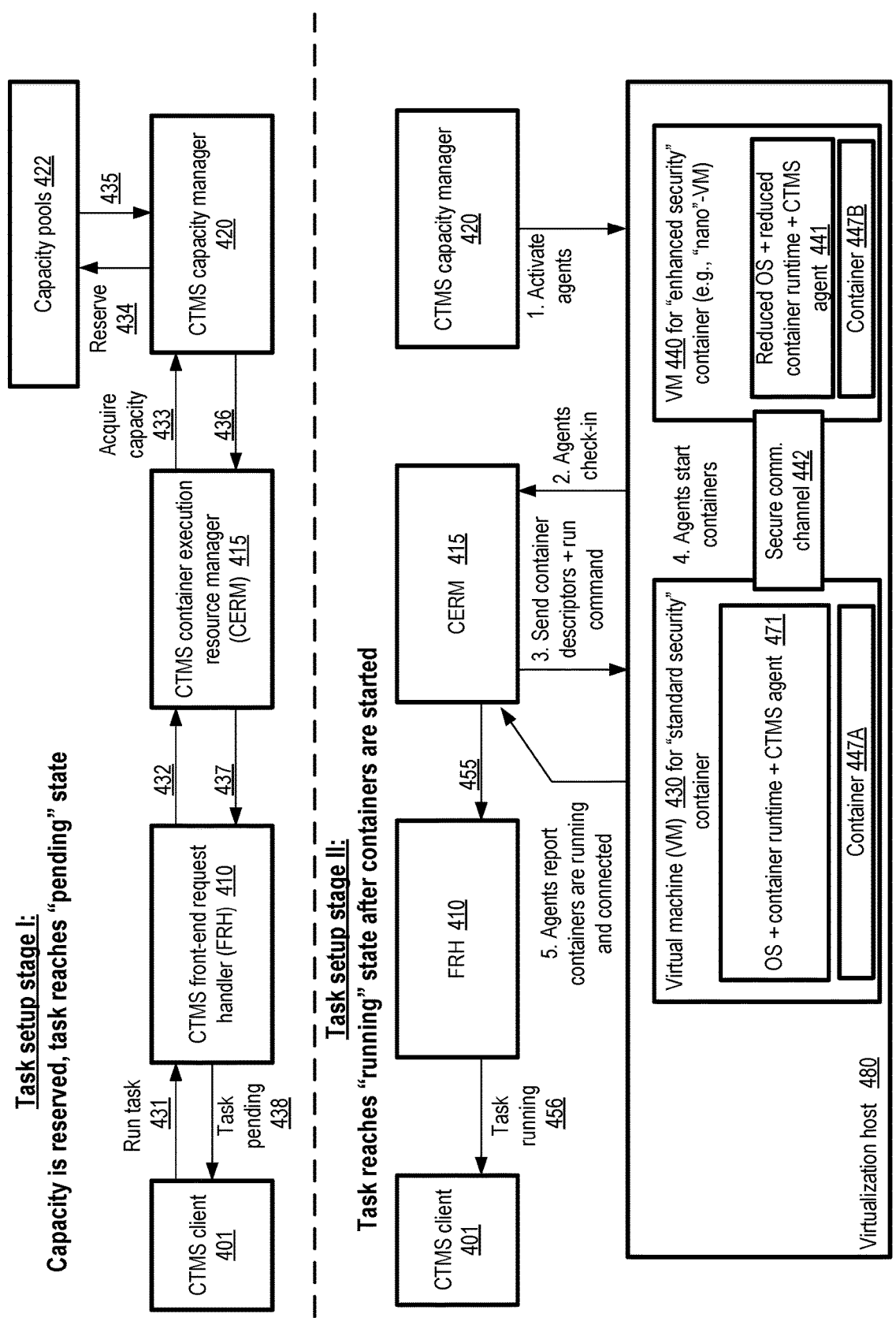
FIG. 4 illustrates example stages of setting up a task which includes containers of different security levels, according to at least some embodiments.

FIG. 4 illustrates example stages of setting up a task which includes containers of different security levels, according to at least some embodiments. Two setup stages are shown for a particular task which comprises a standard security container and an enhanced security container: a first stage in which resources are reserved, and a second stage in which virtual machines and containers are started up at the reserved resources.

Task setup stage I begins in response to receipt of a "run task" request 431 from a client 401 of a CTMS (similar in functionality to CTMS 110 of FIG. 1) at a front-end request handler (FRH) 410 of the CTMS. The run task message may include or indicate a task descriptor or definition in which the set of software containers to be run as part of the task (one standard security container and one enhanced security container in the depicted embodiment) is specified. The FRH may send a message 432 to a CTMS container execution resource manager (CERM) 415 indicating the task to be run.

After examining the contents of the task descriptor, the CERM 415 may send an indication of the required resource capacity (e.g., including processing capacity, memory capacity, storage capacity and the like) for the task to a CTMS capacity manager 420 in the form of an "acquire capacity" message 433. The CTMS capacity manager 420 may in turn send a reservation request (a "reserve" message 434) for the needed resources to one or more capacity pools 422 (e.g., capacity pools of virtualization hosts implemented at a VCS or at the CTMS itself). Assuming that sufficient resources are available, the capacity manager receives an affirmative response message 435 indicating that the resources have been reserved. The capacity manager may inform the CERM 415 via a message 436 that resources have been set aside for the task and that additional operations to start the task have begun or will begin shortly. The CERM may in turn notify the FRH (via message 437) regarding the successful reservation of the resources. The FRH may provide an indication 438 to the client 401 that the status of the task is "pending", i.e., that while the task has not yet been made operational, no errors have been encountered in the initial resource acquisition steps for the task.

The CTMS capacity manager 420 may request the establishment of virtual machines 430 and 440 at a virtualization host 480 at which the resources were reserved, e.g., shortly after reserving the resources in stage I. In some implementations, the virtual machine establishment operations may proceed in parallel with the sending of the messages regarding the pending status of the task in stage I. Virtual machine 430 may represent an instance of a first category of virtual machines supported at a VCS, suitable for the standard security container of the task, while virtual machine 440 may represent an instance of a different category of virtual machines, suitable for the enhanced security container. In an embodiment in which virtual machine categories similar to those shown in FIG. 2 are supported, for example, virtual machine 430 may be a micro VM or a standard VM while virtual machine 440 may be a nano VM. In another embodiment, VM 430 may be a standard VM while VM 440 may be a micro VM. The operating system and container runtime of the VM 430 may offer a wide range of functionality than the operating system and container runtime of the VM 440 in the depicted embodiment. A secure communication channel 442 may be set up for communication between the enhanced security container to be established at the virtual machine 440 and entities external to virtual machine 440 in various embodiments. In at least some embodiments, a communication intermediary process (CIP) (or an intermediary agent comprising one or more processes) may be established within the virtual machine 430 for interactions with the virtual machine 440. In some implementations a section of shared memory which is mapped within respective address spaces of the two virtual machines 440 and 430 may be used as the secure communication channel. In at least some embodiments, a bi-directional notification based mechanism may be used for communications between the two virtual machines 440 and 430. In contrast to techniques which involve polling, an interrupt-driven approach may be used for the communications in such embodiments. In other embodiments, a polling technique may be employed. In at least one embodiment, configuration settings at the virtual machine 440 may be selected such that only specified types of data (e.g., data structures representing results of particular functions performed using security) can be sent outbound over the communication channel 442 from the virtual machine 440; if an attempt is made to transmit any other type of data from the virtual machine 440, the attempt may be aborted and/or flagged as an error.

As part of task setup stage II, the CTMS capacity manager may activate respective CTMS agents at each of the virtual machines 430 and 440, as indicated by the arrow labeled "1". Each CTMS agent may, for example, comprise a respective process or thread which acts as an intermediary between a virtual machine and CTMS control plane or administrative components such as the CERM. After the agents are started, the running portion of the software stack at the virtual machine 440 may comprise a combination of an OS, a container runtime and a CTMS agent 471, while the running portion of the software stack at virtual machine 440 may comprise a reduced version of the operating system (e.g., with support for fewer system calls than the set supported at virtual machine 430, and a smaller set of emulated devices than the set emulated at virtual machine 430), a reduced container runtime (e.g., with support for fewer APIs than the number of APIs supported by the container runtime at virtual machine 430) and a CTMS agent 441.

The CTMS agents may establish communication with the CERM 415 as part of stage II, as indicated by the arrow labeled "2". The CERM may send a descriptor of the container to be run to each of the agents, as well as a respective "run" command to start the execution of the containers, to the agents, as indicated by the arrow labeled "3". Upon receiving the information about their respective containers and the corresponding run commands, the agents may start containers 447A (the standard security container) and 447B (the enhanced security container) of the task, as indicated in label "4". The CTMS agents may confirm that both containers 447A and 447B have started successfully and are able to communicate via the secure communication channel, and send one or status messages (as indicated by the label "5") to the CERM reporting the successful launch of the containers (and their ability to communicate with one another) to the CERM in the depicted embodiment. The CERM may notify the FRH 410 via a message 455 regarding the status of the containers of the task. The FRH in turn may provide a "Task running" notification 456 to the CTMS client 401 in some embodiments. The workflow of starting tasks with containers at different security levels may differ from that shown in FIG. 4 in some embodiments; for example, in one embodiment, information about "pending" tasks may not necessarily be provided to clients.

Example Virtualization Host Components

Figure 5:
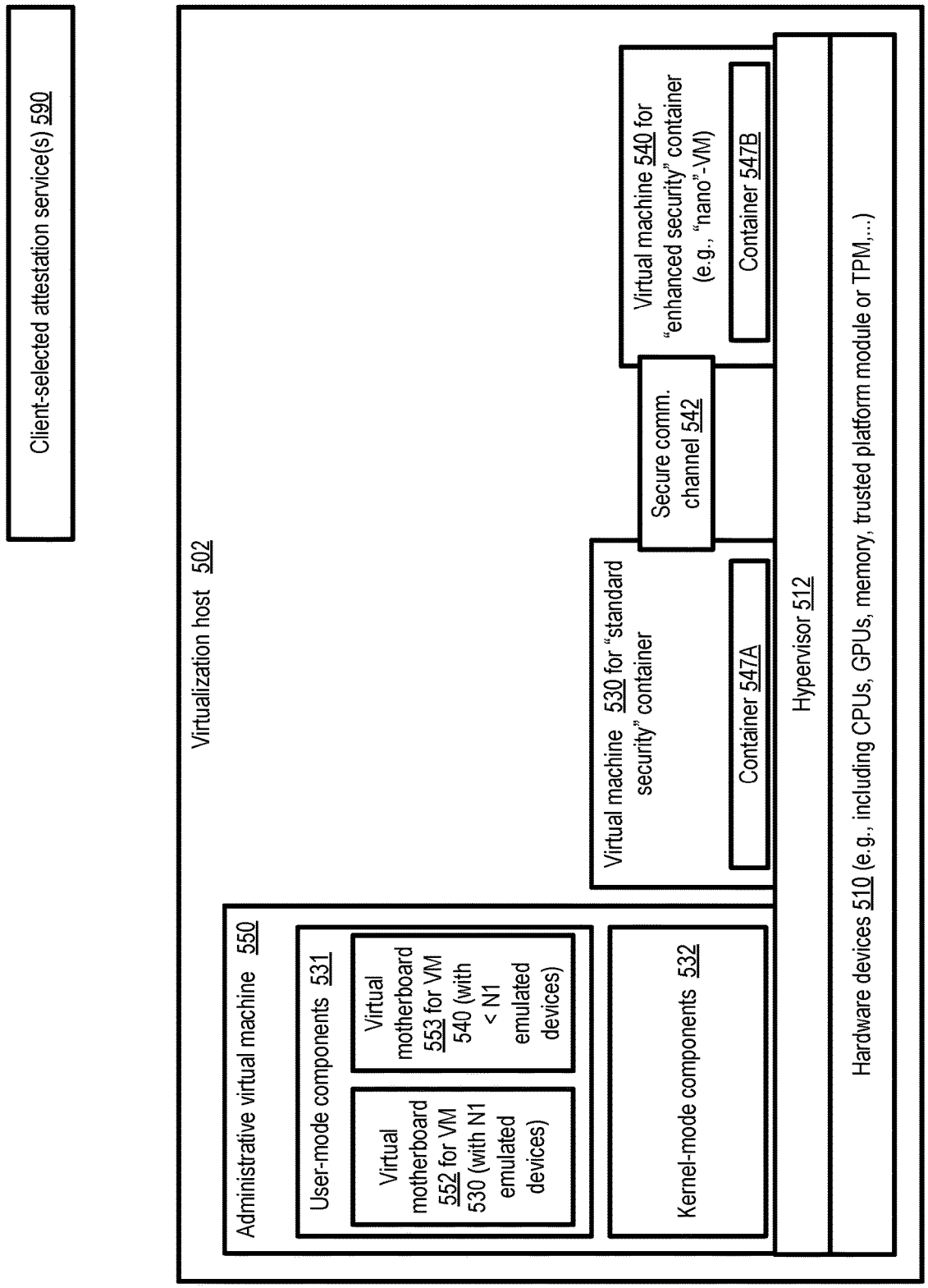
FIG. 5 illustrates components of a virtualization host at which a pair of containers with differing security levels may be configured, according to at least some embodiments.

FIG. 5 illustrates components of a virtualization host at which a pair of containers with differing security levels may be configured, according to at least some embodiments. In the embodiment depicted in FIG. 5, virtualization host 502 comprises a set of hardware devices 510, such as physical processors (CPUs and/or GPUs), memory, a hardware security device such as a trusted platform module (TPM) and the like. The TPM may be used in an attestation procedure in which the trustworthiness of the virtualization host is verified at one or more client-selected attestation services 590 in the depicted embodiment. Attestation services 590 may also be referred to as resource verifiers. Prior to the request to run a task comprising containers 547A and 547B, a CTMS client may submit one or more programmatic requests to a CTMS similar in functionality to CTMS 110 of FIG. 1 to register the attestation service(s) to be used on the client's behalf in various embodiments. During boot-up or initialization procedures of the virtualization host 502, the TPM may capture one or more log records which contain evidence of other hardware components and/or virtualization management components (such as the hypervisor 512 and the administrative virtual machine 550). Such log records may be transmitted to the attestation service(s) 590, where the records may be compared to a pre-generated set of log records generated at virtualization hosts deemed acceptable to the client. The virtual machines 530 and 540 for the containers of the client's tasks, and the containers 547A and 547B themselves, may only be started up if an approval of the virtualization host is received from the attestation service(s) at the CTMS and/or the VCS in various embodiments. In at least one embodiment, similar attestations/approvals may be obtained from client-selected attestation services for the software stack run within the virtual machines 530 and 540, e.g., before starting the containers or at any point in time during the lifetimes of the containers.

As mentioned above, the virtualization management components of the virtualization host 502 may include a hypervisor 512 and an administrative virtual machine 550. The administrative virtual machine (which may be referred to as a domain-zero or dom-0 virtual machine in some implementations) may comprise a set of kernel-mode components 532 and a set of user-mode components 531 in some embodiments. The user-mode components 531 may comprise respective virtual motherboards for each of the virtual machines (such as virtual machine 530 and 540) configured at the virtualization host 502. A given virtual motherboard, also referred to as a device model, may emulate a set of hardware devices which may be accessed on behalf of applications and programs running within the associated virtual machine. In the example scenario shown in FIG. 5, a task comprising a standard security level container 547A and an enhanced security level container 547B has been requested from the CTMS. The CTMS has caused virtual machines 530 (for the standard security container) and 540 (for the enhanced security container) to be launched at the virtualization host 502, and a secure communication channel 542 to be set up for communication between the two virtual machines. Because the kinds of computations to be performed at container 547B may not require as many devices to be accessed as the kinds of computations to be performed at container 547A, the number N2 of devices emulated in virtual motherboard 553 may be smaller than the number N1 of devices emulated in virtual motherboard 552 in the depicted embodiment. The virtual machines 530 and 540 may also differ in other properties as discussed earlier, e.g., with a smaller set of operating system functionality supported at the operating system of virtual machine 540 than is supported at the operating system of virtual machine 530, with a smaller set of container runtime environment functionality supported at the container runtime environment of virtual machine 540 than is supported at the container runtime environment of virtual machine 530, fewer virtual CPUs allocated to the virtual machine 540 than to virtual machine 530, a smaller amount of host memory allocated to the virtual machine 540 than to virtual machine 530, and so on. In some embodiments, at least a subset of the virtualization management components of the virtualization host may be implemented at an offloading device, e.g., comprising a set of processors and memory of a card attached to the primary processors of the virtualization host by a peripheral interconnect such as PCIe or USB (Universal Serial Bus).

Example Inter-Container Connectivity Configurations

Figure 6:
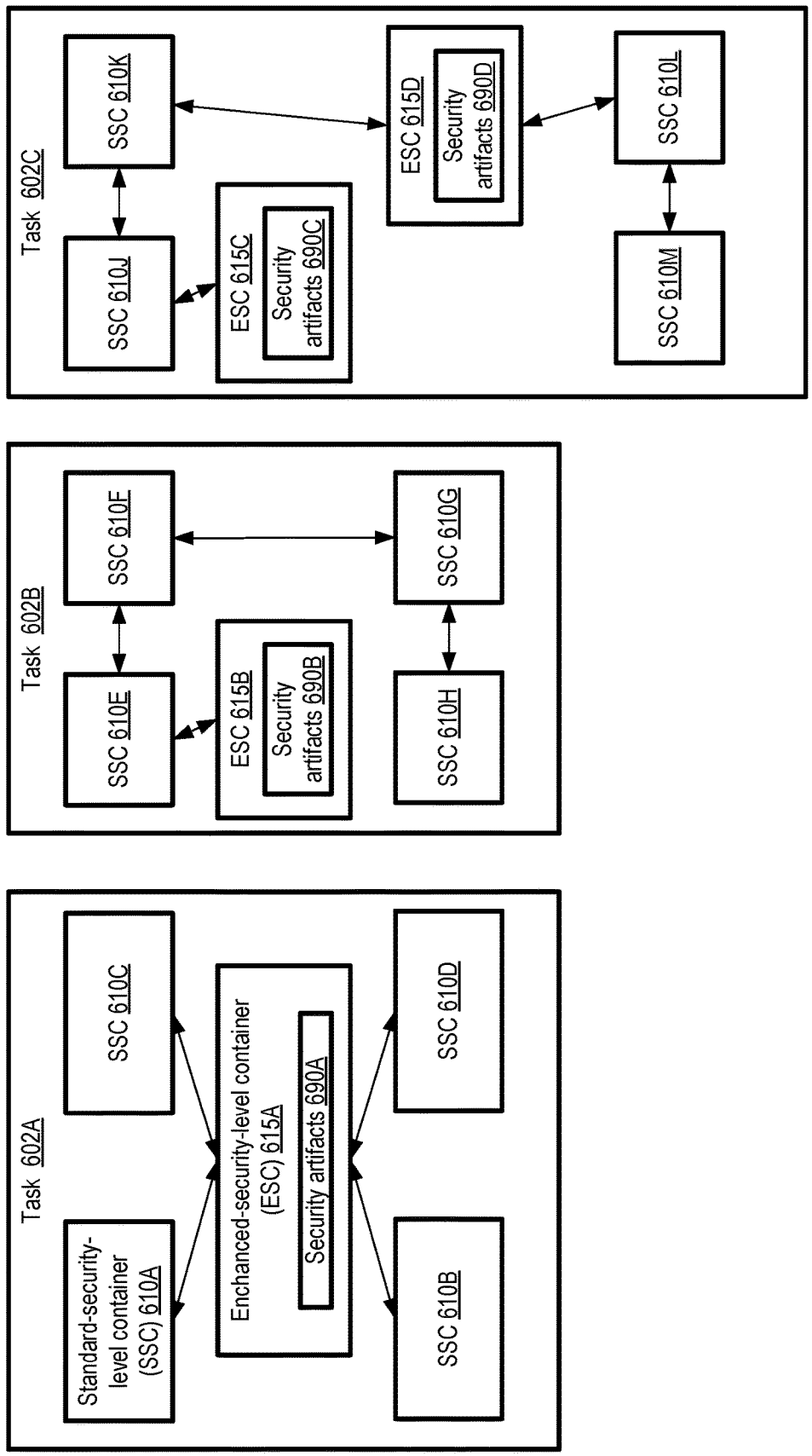
FIG. 6 illustrates examples of inter-container connectivity configurations of multi-container tasks, according to at least some embodiments.

FIG. 6 illustrates examples of inter-container connectivity configurations of multi-container tasks, according to at least some embodiments. Depending on the design of the application(s) being implemented, a variety of approaches may be taken with respect to the manner in which different containers (of respective security levels) are configured to interact or communicate with one another.

In each of the three tasks 602A, 602B and 602C shown by way of example in FIG. 6, computations involving the use of security artifacts (such as cryptographic keys or programs) are performed at enhanced-security-level containers (ESCs), while computations that do not require access to the security artifacts are performed at standard security level containers (SSCs). As discussed earlier, to provide the desired level of security or isolation, a secure communication channel connecting the ESC (or the VM containing the ESC) to at least one SSC may be established.

Task 602A comprises one ESC 615A and SSCs 610A-610D, with communication permitted between the ESC 615A and each of the SSCs. Consequently, computations involving access to or use of security artifacts 690A may be performed at ESC 615A on behalf of (e.g., at the request of processor threads within) any of the SSCs 610A-610D, and results of such computations may be provided to any or all of the SSCs. In some embodiments, the pattern of interconnection shown for Task 602A may be implemented by default for all tasks which (a) comprise at least one ESC and at least one SSC and (b) do not indicate an alternative or non-default inter-container communication requirement in their respective task descriptors. That is, in such embodiments, respective secure communication channels may be created between each SSC and each ESC by default.

Task 602B represents a second pattern of interconnections. As in the case of task 602A, task 602B also has one ESC 615B (at which security artifacts 690B are accessible) and four SSCs 610E-610H. However, in contrast to Task 602A, only one of the SSCs 610E is permitted to communicate with ESC 615B directly via a secure communication channel. Such a non-default approach may be selected by a client for a task, for example, to further reduce the chances of security artifacts such as 690B being misused, as the only entity which can send requests for computations involving the use of artifacts 690B is SSC 610E. Note that as per the task descriptor provided by the client on whose behalf task 602B is run, SSCs such as 610F, 610G and 610H can each communicate with one other SSC, but are not permitted to communicate directly with ESC 615B.

In task 602C, respective types of secure computations may be performed using two different sets of security artifacts 690C and 690D at respective ESCs 615C and 615D. ESC 615C can only communicate with SSC 610J, while ESC 615D is configured to communicate (e.g., via respective secure communication channels) with SSC 610K and SSC 610L. SSC 610M is not configured to communicate directly with any ESC, and the two ESCs 615C and 615D are not configured to communicate with one another. In some embodiments, clients may specify any desired connectivity requirements for the containers of their tasks, as long as the following constraint is satisfied: a given ESC has to be linked to at least one SSC. In other embodiments, such constraints may not be enforced.

Example Mappings of Containers to Virtualization Hosts

Figure 7:
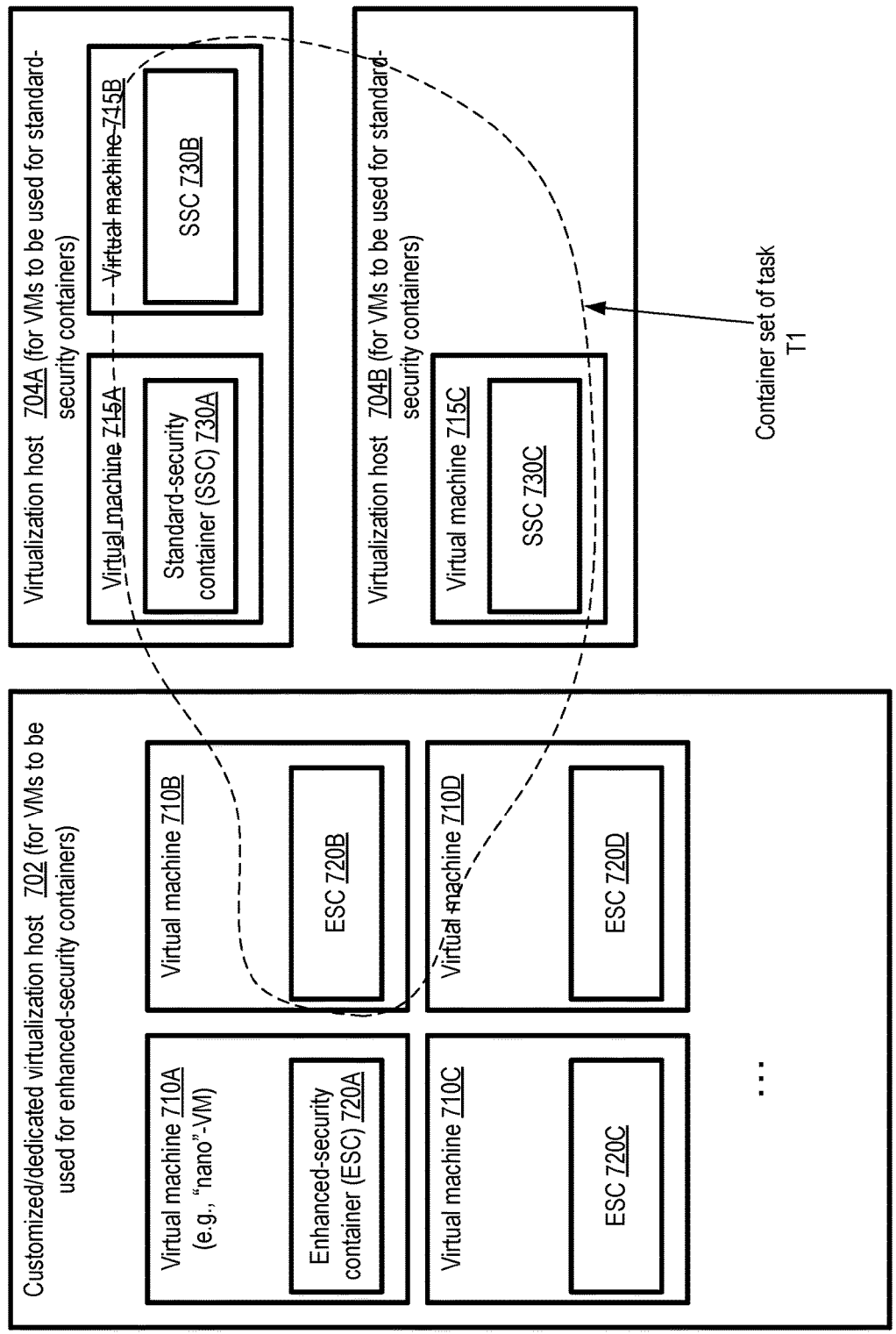
FIG. 7 illustrates an example configuration in which the containers of a task may be executed at several different virtualization hosts, according to at least some embodiments.

In several of the example configurations discussed above, an enhanced security containers of a task is run at the same virtualization host at which a standard security container to which it is linked via a secure communication channel is run. FIG. 7 illustrates an example configuration in which the containers of a task may be executed at several different virtualization hosts, according to at least some embodiments.

In the scenario depicted in FIG. 7, a customized virtualization host 702 may be used to run several enhanced security level containers (ESCs) within respective virtual machines, such as ESC 720A at virtual machine 710A, ESC 720B at virtual machine 710B, ESC 720C at virtual machine 710C, and ESC 720D at virtual machine 710D. The virtualization host 702 may be referred to as customized in the depicted embodiment because it may for example include one or more hardware security devices which are not part of standard or typical virtualization hosts of the VCS, be subjected to regular or frequent re-attestations by external attestation services, have special-purpose networking devices attached which can be used to securely connect the ESCs with other containers of their tasks, and/or for a variety of other reasons. In some embodiments, a dedicated or customized virtualization host such as virtualization host 702 may be utilized by a CTMS because it enables a very large number of small-footprint virtual machines to be configured proactively as a warm pool in a highly secure and thoroughly verified environment, from which individual virtual machines can quickly be assigned for various tasks without going to the trouble of reserving resources on demand.

In various embodiments, one or more ESCs run at a dedicated virtualization host such as 702 may be combined with one or more standard security level containers SSCs run at other virtualization hosts 704 (e.g., 704A or 704B) to implement a given task. For example, the set of containers used for a task T1 may include ESC 720B, SSC 730A (run at virtual machine 715A of virtualization host 704A), SSC 730B (run at virtual machine 715B of virtualization host 704A) and SSC 730C (run at virtual machine 715C of virtualization host 704B). Secure communication channels may be established between ESC 720B and one or more SSCs 730 (e.g., based on connectivity parameters specified by the client on whose behalf task T1 is run) using a secure network protocol such as IPSec, TLS or the like in various embodiments. In some embodiments, when requesting a task, a client of a CTMS may indicate preferences regarding co-location of the containers of the task—e.g., whether all the containers of the task are to be run at the same host, whether a given ESC and its linked SSC are to be run at a single host, and so on. In some embodiments, a component of the CTMS such as a capacity manager may make decisions regarding how the containers of a task are to be mapped to virtualization hosts, e.g., based on available capacity at a VCS, if the CTMS client on whose behalf the task is to be run does not provide guidance regarding container co-locations. In at least one embodiment, dedicated virtualization hosts for ESCs may not be employed.

Example Programmatic Interactions

Figure 8:
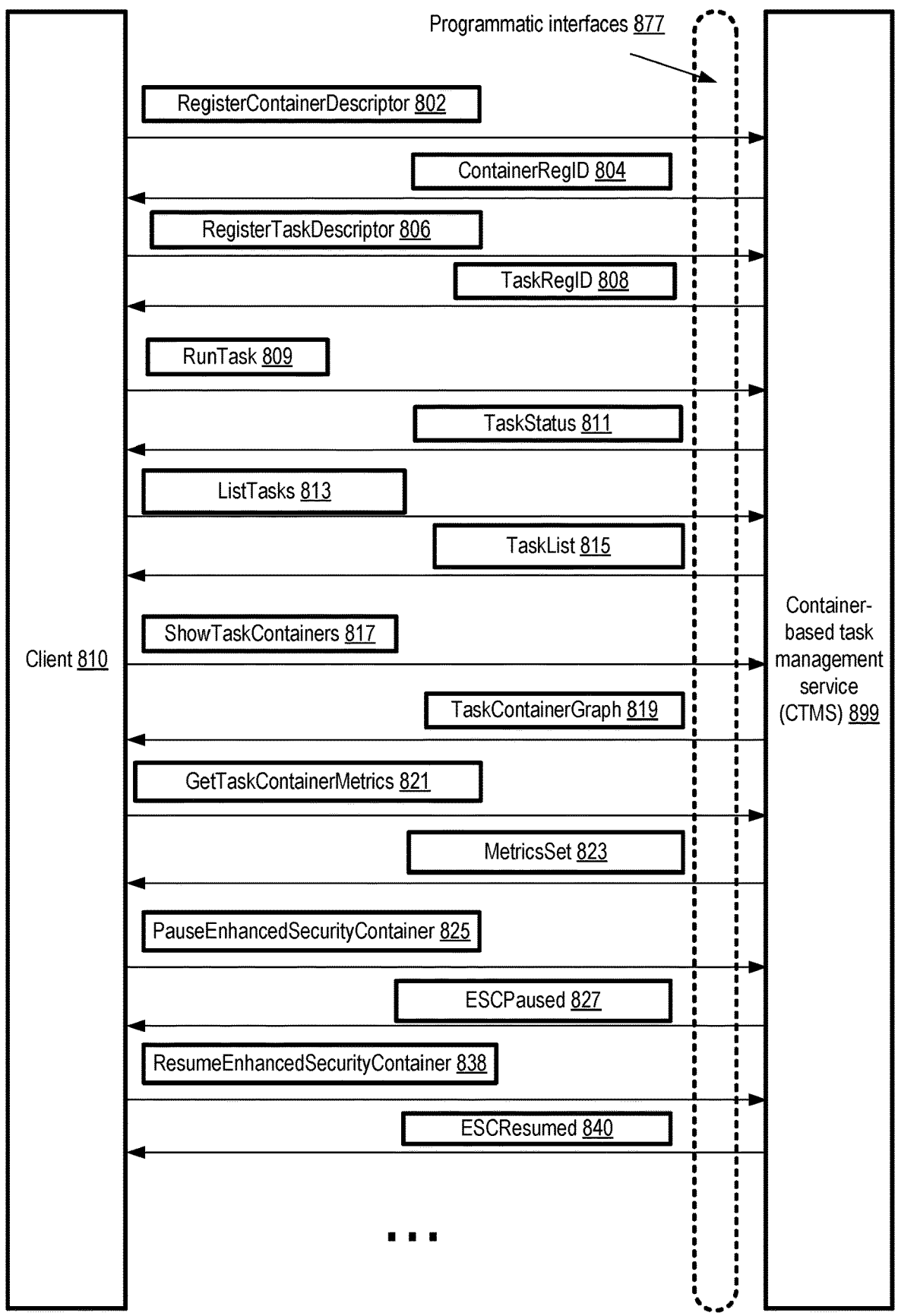
FIG. 8 illustrates example programmatic interactions pertaining to tasks with containers of distinct security levels, according to at least some embodiments.

FIG. 8 illustrates example programmatic interactions pertaining to tasks with containers of distinct security levels, according to at least some embodiments. A CTMS 899, similar in features and functionality to CTMS 110 of FIG. 1, may implement a set of programmatic interfaces 877 in the depicted embodiment, which can be used by a client 810 to submit various types of requests and messages and receive corresponding responses. Programmatic interfaces 877 may include, for example, one or more web-based consoles, command-line tools, a set of APIs, graphical user interfaces or the like in different embodiments.

Using the interfaces 877, a client 810 may submit a RegisterContainerDescriptor request 802, indicating various attributes (including for example a targeted security level, the image to be used, processing requirements, memory requirements and the like) of a software container. The CTMS may store the provided information in a metadata repository and provide an identifier of the registered container in a ContainerRegID message 804 in the depicted embodiment.

A RegisterTaskDescriptor request 806 may be submitted by a client in some embodiments, indicating the constituent types of containers of a task (specified for example using the identifiers of previously-registered containers, or by incorporating the container attributes within a task descriptor), the number of instances of the containers to be run for a given instance of the task, the manner in which the containers are to be connected with one another, co-location requirements/preferences if any, and so on. Information about the task may be stored by the CTMS, and an identifier of the registered task may be provided to the client via a TaskRegID message 808 in some embodiments.

A client may submit a RunTask request 809 via interfaces 877 to initiate the execution of a specified task. In some cases, the RunTask request may indicate the identifier of a previously-registered task, while in other cases the information about the task and its containers may be incorporated within the RunTask request (in effect combining the contents of the RegisterContainerDescriptor and RegisterTaskDescriptor requests with a request to execute the task). In response, a workflow to acquire/identify the needed resources and start up the virtual machines and containers may be initiated (e.g., similar to the startup procedure discussed in the context of FIG. 4) and one or more TaskStatus messages 811 may be sent to the client to indicate the status (e.g., "pending", "running", etc.) of the task may be sent to the client in the depicted embodiment. In some embodiments, one or more of the RunTask, RegisterTaskDescriptor or RegisterContainerDescriptor requests may indicate attestation or resource verification requirements for the containers of a task, and the CTMS may ensure that the virtualization host (and/or other resources used for the containers) are approved by a pre-selected attestation service or resource verifier before launching the containers. In some cases, a client 810 may indicate that some containers (such as enhanced security containers) are to be run at attested hosts while other containers of the same task may not have to run on attested hosts.

A client may submit a ListTasks request 813 to obtain an indication of the set of tasks that are running on behalf of the client, or were run during some time interval. In at least one embodiment a parameter of the ListTasks request may be used to filter tasks based on specified attributes—e.g., to list only those tasks which include an enhanced security level container, or to list only those tasks whose containers use at least one of a specified set of machine images, etc. A set of tasks which meet the specified filtering criteria (or all of the client's tasks if no filtering criterion is indicated) may be provided via one or more TaskList messages 815 by the CTMS in the depicted embodiment.

A client may submit a ShowTaskContainers request 817, indicating one or more tasks whose container set is to be shown, in the depicted embodiment. In response, the CTMS may cause a visual representation of the containers of the tasks to be presented, e.g., in the form of one or more TaskContainerGraph responses 819. In at least some embodiments, one or more visual cues such as colors, shades, icons (such as padlocks suggesting high security) or icon sizes may be used to distinguish enhanced-security containers from other containers of the task(s) in the representation provided to the client. A client may obtain additional details about enhanced security containers (e.g., the mechanisms used for the container's secure communication channels, attestation details, etc.) by, for example, clicking on the icons representing the enhanced security containers in some implementations. Similar interactive interface elements may be supported for standard security level containers in at least some embodiments.

A number of different types of metrics may be collected for tasks and their constituent containers in various embodiments, such as the number of requests for secure computations that have been transmitted to a given enhanced security container during the previous T hours/minutes, resource utilization metrics for each of the containers of a task, and so on. A client 810 may submit a GetTaskContainerMetrics request 821 in some embodiments to obtain collected metrics of a specified task and/or individual containers of a task. In response, one or more MetricsSet messages 823 containing the requested metrics may be transmitted to the client in the depicted embodiment.

In some embodiments, an enhanced security container may not necessarily be required to run throughout the time period that other containers of its parent task are run—for example, secure computations for which the enhanced security container is established may only be needed during some stages of a multi-stage application. The probability of attackers obtaining artifacts such as cryptographic keys used at such an enhanced security container may be further reduced in some embodiments by pausing the execution of the container during time periods when it is not needed. A PauseEnhancedSecurityContainer request 825 submitted by a client may result in the saving of the state of a specified enhanced security container followed by suspension or pausing of execution of the container in the depicted embodiment. The CTMS may send an ESCPaused message 827 to confirm the suspension in some embodiments. The execution of the enhanced security container may be resumed in response to a ResumeEnhancedSecurityContainer request 838. An ESCResumed message 840 may be sent to the client to indicate that the container has resumed execution. In some embodiments, combinations of programmatic interactions other than those shown in FIG. 8 may be supported for the management of containers with client-selected security levels.

Methods for Supporting Software Containers with Selectable Security Levels

Figure 9:
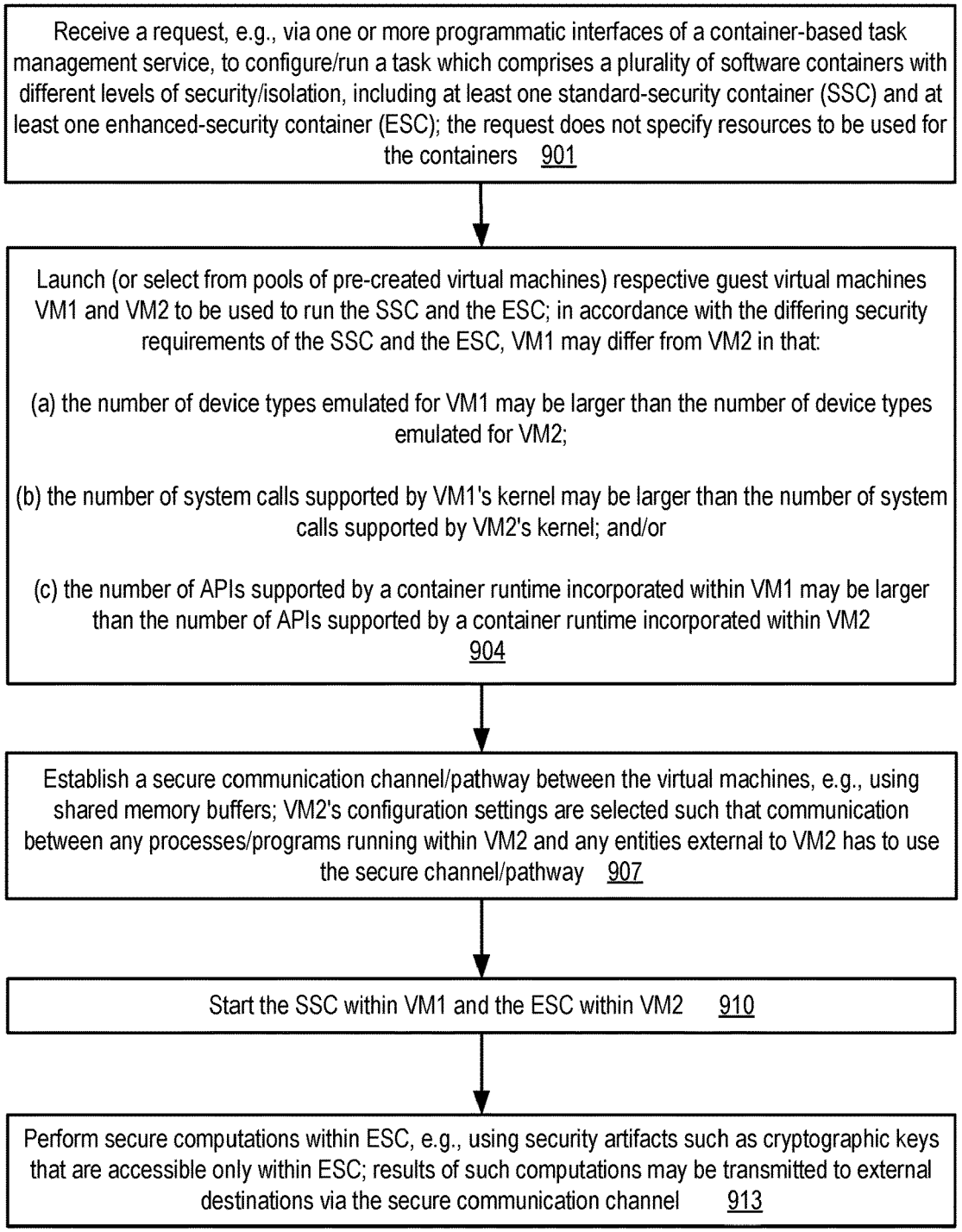
FIG. 9 is a flow diagram illustrating aspects of operations that may be performed to configure and use software containers with differing security levels, according to at least some embodiments.

FIG. 9 is a flow diagram illustrating aspects of operations that may be performed to configure and use software containers with differing security levels, according to at least some embodiments. As shown in element 901, a request may be received, e.g., via one or more programmatic interfaces of a CTMS similar in features and functionality to CTMS 110 of FIG. 1, to configure and run a task which comprises several different software containers, including at least one standard security level container (SSC) and at least one enhanced security level container (ESC). The request may not indicate the resources to be used for the individual containers or for the task as a whole in the depicted embodiment.

A respective virtual machine, representing an instance of a category of virtual machines selected from a family of supported virtual machine categories may be used for each of the containers of the task in various embodiments. In some embodiments new virtual machines may be launched for at least some of the containers; in other embodiments, one or more of the virtual machines may be selected from a pool of virtual machines which have already been launched and (at least partially) configured, thereby reducing the time taken to get the task up and running. To satisfy the respective security requirements of the SSC and the ESC, as shown in element 904, respective guest virtual machines VM1 and VM2 which differ from one another along one or more dimensions associated with the diversity or range of operations that can be performed may be utilized for the SSC and the ESC. The number of device types or devices emulated (e.g., as part of a virtual motherboard or device model) at/for VM1 (which is used for the SSC) may be greater than the number of device types or devices emulated at/for VM2 (which is used for the ESC) in at least some embodiments. The number of system calls supported by VM1's operating system kernel may be larger than the number of system calls supported by VM2's operating system kernel in at least some embodiments. The number of APIs supported by a container runtime incorporated within VM1 may be larger than the number of number of APIs supported by a container runtime incorporated within VM1 in at least some embodiments.

Appropriate communication pathways or channels between the virtual machines used for the task's containers may be set up to facilitate inter-container interactions in various embodiments. For example, in the embodiment depicted in FIG. 9, a secure communication channel or pathway may be set up between VM1 and VM2 (element 907). If both VM1 and VM2 are run at the same virtualization host, in some implementations shared memory buffers may be used for the communication channel; if the two VMs are run at different virtualization hosts, a protocol similar to IPSec may be used for the channel in at least one implementation. To ensure that the computations of the ESC are run in a highly isolated environment, in various embodiments VM2's configuration settings may be selected such that the only way in which processes/threads running within VM2 can communicate with any process/thread outside VM2 is via the secure communication channel connecting VM2 to VM1.

The SSC may be started up at VM1, e.g., using a CTMS agent similar to the agents discussed in the context of FIG. 4, and the ESC may be started up at VM2 in the depicted embodiment (element 910). Secure computations may then be performed as needed at the ESC (element 913), e.g., using security artifacts such as cryptographic keys or programs which are not accessible outside the ESC. Results of such computations may be transmitted to external destinations (e.g., programs running at the SSC, or at other containers of the task) via the secure communication channel.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Illustrative Computer System

Figure 10:
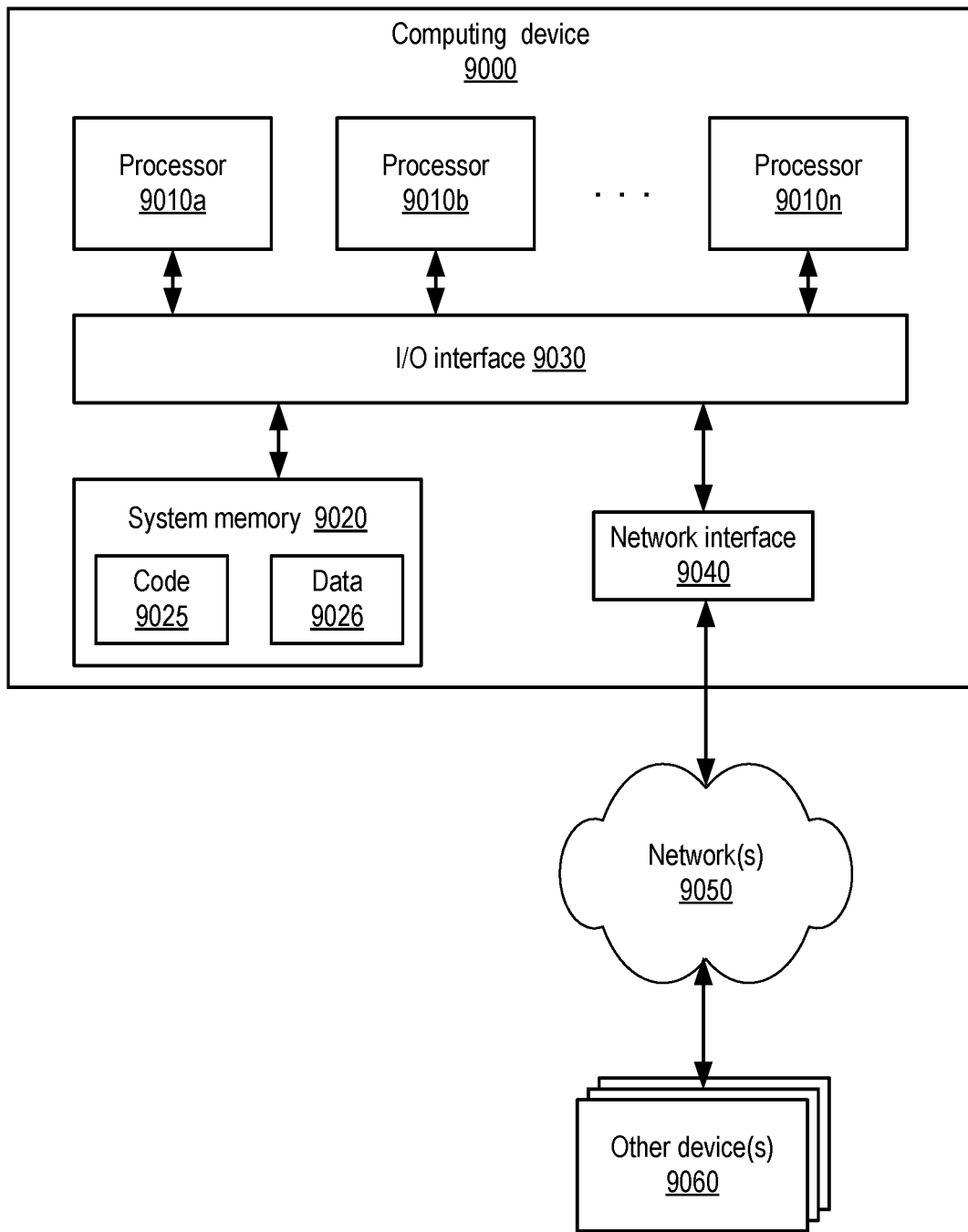
FIG. 10 is a block diagram illustrating an example computing device that may be used in at least some embodiments.

In at least some embodiments, a server that implements the types of techniques described herein (e.g., various functions of a container-based task management service and other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010

(e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain, via one or more programmatic interfaces of a container-based task management service of a provider network, a task configuration request indicating a plurality of software containers of a task, including a first software container and a second software container, wherein the task configuration request indicates that a targeted security level of the second software container exceeds a targeted security level of the first software container, and wherein the request does not indicate a resource to be used to execute a software container;
cause to be launched, by the container-based task management service, a first virtual machine and a second virtual machine to execute the first and second software containers respectively at one or more virtualization servers, wherein, in accordance with the respective targeted security levels of the first and second software containers:
(a) a first number of device types emulated for the first virtual machine exceeds a second number of device types emulated for the second virtual machine,
(b) a first number of operating system calls (syscalls) supported by an operating system kernel of the first virtual machine exceeds a second number of syscalls supported by an operating system kernel of the second virtual machine and
(c) a first number of application programming interfaces (APIs) supported by a first container runtime of the first virtual machine exceeds a second number of APIs supported by a second container runtime of the second virtual machine;
cause, by the container-based task management service, (a) the first software container to be executed within the first virtual machine and (b) the second software container to be executed within the second virtual machine, wherein one or more configuration settings of the second virtual machine prevent communication between the second software container and entities external to the second virtual machine via channels other than a secure communication channel established between the first and second virtual machines; and
cause a result of a computation performed using a security artifact at the second software container to be transmitted to the first software container, wherein the security artifact is not accessible to the first software container.

2. The system as recited in claim 1, wherein the one or more computing devices include further instructions that upon execution on or across the one or more computing devices further cause the one or more computing devices to:
obtain, via the one or more programmatic interfaces, a co-location parameter applicable to at least the first and second software containers; and
cause the first and second virtual machines to be launched at one or more virtualization hosts in accordance with the co-location parameter.

3. The system as recited in claim 1, wherein the task configuration request indicates a third software container of the task, and wherein the one or more computing devices include further instructions that upon execution on or across the one or more computing devices further cause the one or more computing devices to:
cause another secure communication channel to be established between the second virtual machine and a third virtual machine within which the third software container is executed.

4. The system as recited in claim 1, wherein the one or more computing devices include further instructions that upon execution on or across the one or more computing devices further cause the one or more computing devices to:
obtain an indication, prior to launch of the second virtual machine, that a virtualization host at which the second virtual machine is launched has been approved by a resource verifier selected by a client on whose behalf the second software container is executed.

5. The system as recited in claim 1, wherein the task configuration request indicates one or more of: (a) a first machine image to be used for the first software container or (b) a second machine image to be used for the second software container.

6. A computer-implemented method, comprising:
determining that a targeted security level of a first software container of a task to be executed exceeds a targeted security level of a second software container of the task;
identifying a first virtual machine and a second virtual machine to execute the first and second software containers respectively, wherein, in accordance with the respective targeted security levels of the first and second software containers:
(a) a first number of devices emulated for the first virtual machine is smaller than a second number of devices emulated for the second virtual machine, and
(b) a first number of operating system calls (syscalls) supported by an operating system kernel of the first virtual machine is smaller than a second number of syscalls supported by an operating system kernel of the second virtual machine; and
causing (a) the first software container to be executed within the first virtual machine and (b) the second software container to be executed within the second virtual machine, wherein one or more configuration settings of the first virtual machine prevent communication between the first software container and entities external to the first virtual machine via channels other than a secure communication channel established between the first virtual machine and the second virtual machine.

7. The computer-implemented method as recited in claim 6, further comprising:
launching the first virtual machine at a first virtualization host; and
launching the second virtual machine at the first virtualization host.

8. The computer-implemented method as recited in claim 6, further comprising:
obtaining, via one or more programmatic interfaces, a request to execute the task, wherein said determining that the targeted security level of the first software container exceeds the targeted security level of the second software container is based at least in part on one or more parameters of the request.

9. The computer-implemented method as recited in claim 6, further comprising:
obtaining, via one or more programmatic interfaces, indications of respective machine images to be used for the first and second software containers.

10. The computer-implemented method as recited in claim 6, wherein the first virtual machine comprises a first container runtime supporting a first number of application programming interfaces, and wherein the second virtual machine comprises a second container runtime supporting a different number of application programming interfaces.

11. The computer-implemented method as recited in claim 6, wherein identifying the first virtual machine comprises selecting the first virtual machine from a pool of pre-created virtual machines.

12. The computer-implemented method as recited in claim 6, wherein the secure communication channel comprises one or more shared memory buffers.

13. The computer-implemented method as recited in claim 6, wherein the secure communication channel utilizes a version of an Internet Protocol Security (IPSec) protocol.

14. The computer-implemented method as recited in claim 6, further comprising:
obtaining an indication that the task comprises a third software container which is not to communicate with the first software container; and
causing the third software container to be executed in a third virtual machine, without establishing a communication channel between the third virtual machine and the first virtual machine.

15. The computer-implemented method as recited in claim 6, further comprising:
obtaining, via a programmatic interface, an indication of a host attestation service from a client on whose behalf the task is to be implemented; and
verifying, prior to causing the first software container to be executed at the first virtual machine, that a virtualization host at which the first virtual machine is executed has been attested by the host attestation service.

16. One or more non-transitory computer-accessible storage media storing program instructions that when executed on or across one or more processors cause the one or more processors to:
obtain a task descriptor via a programmatic interface, wherein the task descriptor indicates a plurality of software containers including the first software container and a second software container;
determine, based at least in part on input received via the programmatic interface, that the first software container is to be executed at an enhanced level of isolation compared to the second software container;
select, from among a plurality of categories of virtual machines of a virtualized computing service and based at least in part on the enhanced level of isolation, a first category of virtual machines to be used to execute the first software container, wherein the first category of virtual machines includes a reduced software stack that differs from software stacks of virtual machines of one or more other categories of the plurality of categories;
cause the first software container to be executed within a first virtual machine of the first category; and
cause the second software container to be executed within a second virtual machine of a second category of the plurality of categories.

17. The one or more non-transitory computer-accessible storage media as recited in claim 16, storing further program instructions that when executed on or across the one or more processors further cause the one or more processors to:
determine the enhanced level of isolation of the first software container based at least in part on a security level of the first software container specified by the input.

18. The one or more non-transitory computer-accessible storage media as recited in claim 16, wherein the first category differs from one or more other categories of the plurality of categories in at least (a) a number of device types emulated by virtual machines of the respective categories or (b) a number of supported operating system calls for virtual machines of the respective categories.

19. The one or more non-transitory computer-accessible storage media as recited in claim 16, wherein the first category differs from one or more other categories of the plurality of categories in one or more features of a container runtime included in virtual machines of the respective categories.

20. The one or more non-transitory computer-accessible storage media as recited in claim 16, storing further program instructions that when executed on or across the one or more processors further cause the one or more processors to:
obtain an indication of a resource verification requirement associated with first software container; and
cause a verification of a resource used for the first software container to be obtained from an attestation service.

* * * * *